June 27, 1967

J. W. KALB 3,328,640

ELECTRICAL CONDUCTOR SYSTEM

Filed Nov. 16, 1964

INVENTOR.
JOHN W. KALB
BY
Kenneth W. Miller
ATTORNEY

INVENTOR.
JOHN W. KALB
BY Kenneth W. Miller

United States Patent Office 3,328,640
Patented June 27, 1967

3,328,640
ELECTRICAL CONDUCTOR SYSTEM
John W. Kalb, Medina, Ohio, assignor to The Ohio Brass Company, Mansfield, Ohio, a corporation of New Jersey
Filed Nov. 16, 1964, Ser. No. 411,342
14 Claims. (Cl. 317—72)

This invention relates to electrical conductor systems and, more specifically, to protecting the elements of the system against lightning strokes, overvoltages, and the like.

The principal object of the invention is to protect electric line conductors and insulators from lightning strokes and from the effects of transient disturbances induced in the system by lightning discharges generally.

Another object of the invention is to protect electric conductors and insulators from the effects of contaminants in the surrounding atmosphere and to insure system operation under such conditions.

A specific object of the invention is to simplify and reduce the cost of lightning protection in electrical distribution lines and power systems.

Electric power systems utilized for the transmission and distribution of electrical energy are, to a large extent, constituted as power lines having two or three line conductors supported above the ground by an elevating structure which carries the conductors in laterally and/or vertically spaced relation. The conductors comprise wires or cables supported in spaced electrically separate relation by pin, post, or suspension insulators arranged in suitable configurations between the supporting structure and the conductor. Such systems are designed and operated at a great range of voltages, usually ranging from 66 kv. to 110 kv. for distribution circuits, 600 volts to 37 kv. or higher for secondary distribution circuits, and 110 kv. to 500 kv. or more for transmission circuits, depending upon the physical extent, load capability, and economic limitations imposed upon the particular system.

Because of the overhead positioning and physical extent of power lines, the line conductors may be subjected to direct strokes of lightning during electrical storms, or may have overvoltages induced therein by lightning discharges in the vicinity, either directly or by disturbance of the normal energy distribution in the system. Various means have been utilized to discharge the energy of direct strokes or of lightning-induced transients from the conductor to ground, particularly by the use of lightning arresters connected from the conductor to ground. Various special arrangements of conductors have been proposed and used for enhancing the protective effect of the lightning arrester, including arrangements in which one conductor is positioned above the remaining conductors to form a protected region for the remaining conductors, a lightning arrester being connected from the one conductor to ground.

The present invention relates to an improved and simplified arrangement for protection of electric conductor systems in which a protective or discharge circuit is constituted by an insulator which supports the conductor and a resistor connected in a series circuit from the insulator to ground. According to the principal embodiment of the invention, the resistor is connected to a base or conductive support for the insulating body which constitutes the insulator, and an arc or other discharge between the conductor or conductor holder and the conductive support completes the circuit so that energy flows from the line conductor through the resistor to ground. The current flow generates a voltage which diminishes the potential or excess energy and effectively limits the current from the conductor to ground. The current limiting function is useful in protecting the insulator and the system against the effects of surface leakage on the insulator due to local contaminants.

In a preferred embodiment of the invention, the resistor is a non-linear resistor, having a voltage exponent greater than one and a decreasing resistance with increasing current characteristic, such that power follow currents originating in the electrical system protected are limited to safe values while permitting discharge of the energy of direct strokes without developing excessive voltages in the conductor system.

In another embodiment of the invention, a valve arrester is connected from the insulator to ground so that the system is protected against overvoltages in excess of those required to establish arcing paths across the insulator and across the spark gap of the valve arrester. Accordingly, the system is protected against excess power follow current flow and against excess load upon the discharge resistor, although the insulator is faulty or is damaged.

The invention, together with further objects, features, and advantages thereof, will be more clearly understood by reference to the following detailed specification and claims, taken in connection with the appended drawings in which:

Figure 1:
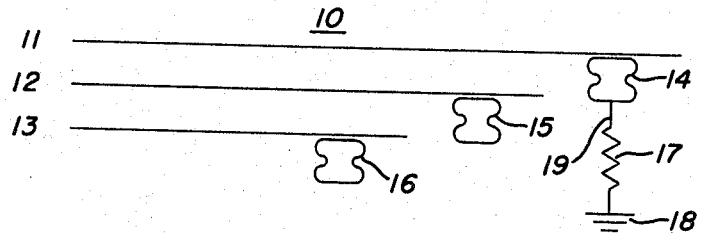
FIG. 1 is a schematic diagram of an embodiment of the invention in which a single discharge path is provided from one line conductor, through a valve resistor, to ground.

In FIG. 1 there is shown a distribution line, designated generally at 10, comprising line conductors 11, 12, and 13, such as a part of a circuit between a substation and a residence. Each of the line conductors 11, 12, and 13 is supported from a line pole by an insulator of known design, such as the insulator 14 for the line conductor 11, the insulator 15 for the line conductor 12, and the insulator 16 for the line conductor 13. The line conductors may comprise a three-phase circuit or a two or three wire single phase circuit.

The protective arrangement of the invention comprises a connection from the insulator 14, through a resistor 17, to a ground, schematically illustrated at 18. According to the invention, the insulator 14 and the resistor 17 comprise a series discharge circuit 19 between the conductor 11 and ground for discharge of energies which produce a line-to-ground voltage sufficient to form an arc across the exterior surface of the insulator 14. The resistor 17 and the series circuit from the insulator to ground comprise a current limiting device for interrupting arc discharges and for limiting current flow over the surface of the insulator.

Figures 6, 7:
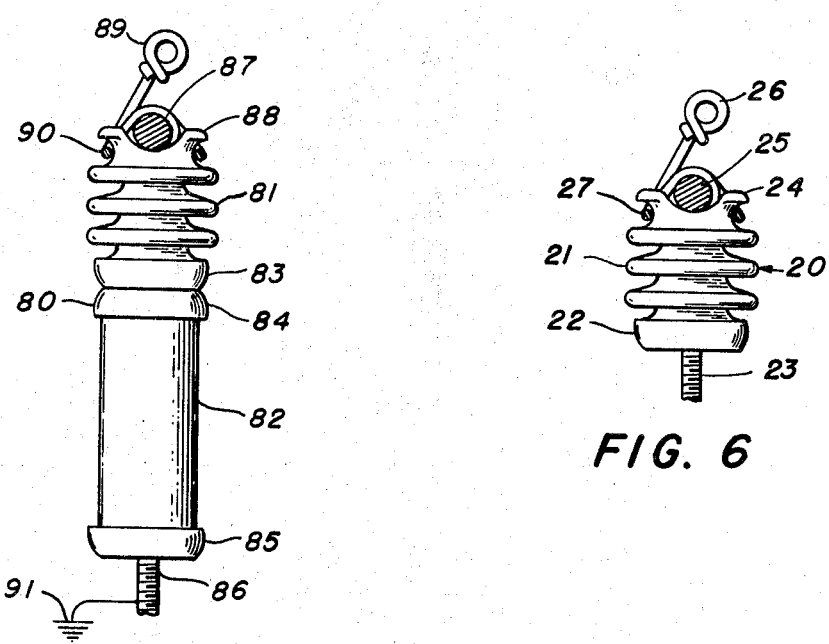
FIG. 6 illustrates an arrangement of line conductor and insulator useful for the practice of the invention.
FIG. 7 shows a line protective device according to the invention.

The construction of the insulator 14 is shown in detail in FIG. 6, wherein the insulator 20 is constituted by a ceramic insulating body 21, a metal base 22 for the body 21, and a mounting bracket comprising a bolt 23 threaded into the base 22. The extremity or top 24 of the insulator is formed to receive a conductor cable 25, comprising the conductor 11 referred to in FIG. 1, and a tie wire 26 holds the cable 25 in secured relation to the insulator.

In accordance with the invention, the tie wire 26 and base 22 function as gap electrodes and define an arcing path with the exterior surface of the porcelain body 21. Formation of an arc between the tie wire 26 and base 22, due to an overvoltage in the conductor system, establishes an electrically continuous circuit from the conductor 11, through the resistor 17, to the ground 18. Because of the characteristics of the resistor 17, a current flow in the discharge circuit 19, accompanying the arc across the insulator, increases the voltage of the base 22 of the insulator, relative to ground, and results in interruption of the arc. This is normally accomplished within a short interval of time such that there is no substantial flow of power follow current from the supply system connected to the conductor 11, through the discharge circuit 19, to ground.

The characteristics of the valve resistor 17 determine the functioning of the discharge circuit 19. Thus, it is desirable that the resistor 17 comprise a non-linear resistor having a decreasing resistance characteristic as a function of increasing current magnitude, such as is utilized in lightning arresters and referred to as valve resistors. In one embodiment of the invention, a valve resistor 17 has a resistance of 2,000 ohms for power follow currents and a resistance of 8 ohms and less for direct stroke currents having a magnitude of about 10,000 amperes and more. In a discharge circuit 19 constituted with a resistor 17, such as that just described, the energy due to direct lightning strokes may be safely discharged without developing excess voltages on the conductor 11 and without excess power follow current at the termination of the stroke discharge. In circumstances where conductive paths may be established over the exterior surface of the insulator 14, due to the deposit of local contaminants or due to deterioration of the exterior surface portion of the insulator, the resistor 17 limits the flow of current from conductor. The discharge circuit terminates or limits the process before flashover occurs. In the arrangements of the prior art, the insulator is destroyed and the conductor wire dropped or a system fault sufficient to put the line out of service is initiated.

It will be seen that resistors having a voltage exponent of unity, that is, linear resistors, may be useful in some circumstances and that, in non-linear resistors generally, the decreasing resistance function of increasing current magnitude is a desirable characteristic although not necessary to the practice of the invention. A non-linear resistor having a voltage exponent varying through the range of expected currents, for example between about 1.5 and 6, is useful.

In the functioning of the insulator 20 in the manner described, the circumferentially extending portion 27 of the tie wire 26 and the adjacent extremity of the base 22 constitute electrodes for the arc which is formed along the exterior surface or across the extremities of the flanges of the insulating body 21. Suitable metal parts or other conductive means may be provided at the upper extremity of the insulating body to function as the upper electrode during discharge, such as the conductor clamps of known insulators. Alternately, metalized bands may be formed on the exterior surface of the insulating body adjacent the upper extremity of the insulating body during manufacture. The base 22 is an annular casting and has the lower extremity of the insulating body received within the casting and secured thereto by a body of cement, as is known in the art. The design of the insulator 20 should be such that the base 22 is not electrically separated from the surface of the insulator by other parts, particularly where operation in contaminated locations is contemplated.

The invention may be practiced with insulators having any of various compositions, such as, for example and without limitation, porcelain and glass fiber reinforced epoxy or other high polymer resins.

Figure 2:
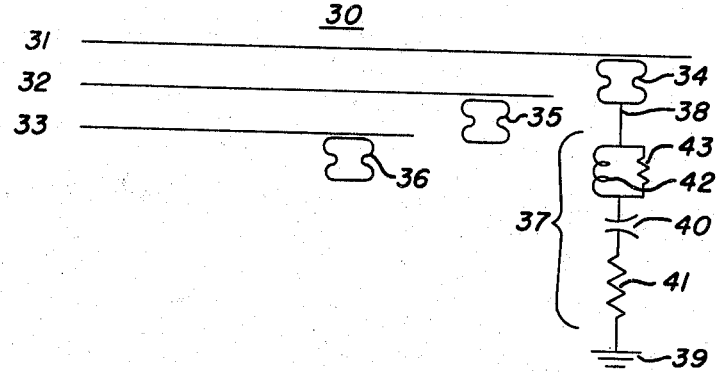
FIG. 2 is a schematic diagram of an embodiment of the invention of FIG. 1 incorporating a magnetic valve arrester.

In the embodiment of FIG. 2, a distribution line 30 is constituted by three line conductors 31, 32, and 33 supported by insulators 34, 35, and 36 respectively. The insulator 34 is connected in series with a valve arrester 37 to constitute a series discharge circuit 38 from the line conductor 31 to ground 39. The arrester 37 comprises a series spark gap 40, a non-linear valve resistor 41, a magnetic control coil 42, and a shunt non-linear resistor 43, of known design.

The functioning of the discharge circuit 38 is substantially similar to that of the discharge circuit 19, being determined by an overvoltage on the line conductor 31 of magnitude sufficient to establish an arc across the exterior surface of the insulator 34 and across the spark gap 40. Since the gap 40 is in series with the insulator 34, that gap partially determines the initial arc-over characteristics of the circuit 38, and the discharge characteristics of the two elements may be combined for best system energy discharge characteristics. Because of the control of arc movement in the gap 40 afforded by the functioning of the magnetic control coil 42 and shunt resistor 43, the interruption of the discharge circuit 38 is more exactly controlled than the discharge circuit 19.

The discharge circuit 38 is useful for systems installed at locations where air-borne contaminants are deposited upon the exterior surfaces of insulators which support line conductors. Under such circumstances, leakage currents over the surface of the insulator 34, resulting from ionized conducting paths in surface deposits on the insulators, will not produce an excess of line current sufficient to actuate circuit interrupters, but will protect the conductor system against lightning. The arrester 37 may incorporate known arrangements of resistance grading to determine the voltages at which discharge will take place through the circuit 38.

Figure 3:
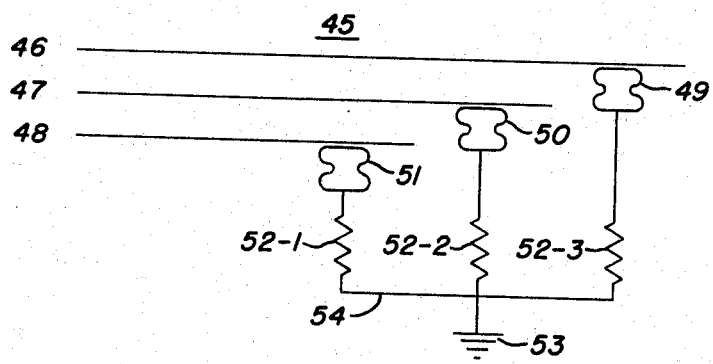
FIG. 3 is a schematic diagram of an embodiment of the invention in which a plurality of line conductors discharge to ground through a single valve resistor.

In the embodiment of FIG. 3, the distribution line 45 is constituted by line conductors 46, 47, and 48 supported by insulators 49, 50, and 51. The insulators 49, 50, and 51 are separately connected to the terminals of three valve resistors 52–1, 52–2, and 52–3 which have the terminals connected to a ground such as the common ground 53 to constitute a discharge circuit 54. The existence of an overvoltage on any one of the conductors 46, 47, and 48 produces an arc discharge across the insulator to establish a discharge path through the valve resistor 52 to ground. The insulators 49, 50, and 51 have an insulating capability such that a back arc will not be formed across two of the insulators to short circuit two of the associated line conductors.

Figure 4:
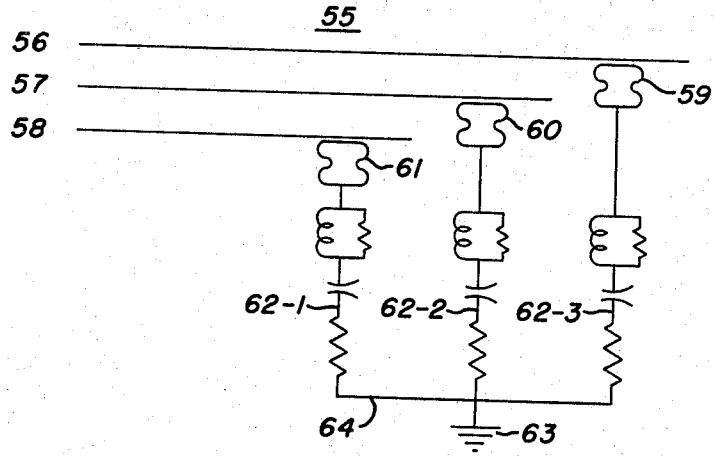
FIG. 4 is a schematic diagram of an embodiment of the invention in which a plurality of line conductors discharge to ground through a single valve arrester.

In the embodiment of FIG. 4, the distribution line 55 is constituted by line conductors 56, 57, and 58 supported by insulators 59, 60, and 61. The insulators 59, 60, and 61 are connected to the terminals of three valve arresters 62–1, 62–2, and 62–3, which are connected to a ground 63 to form a discharge circuit 64. The arrangement of FIG. 4 provides the protective features of the circuit of FIG. 2 in the line conductor arrangement of FIG. 3.

Figure 5:
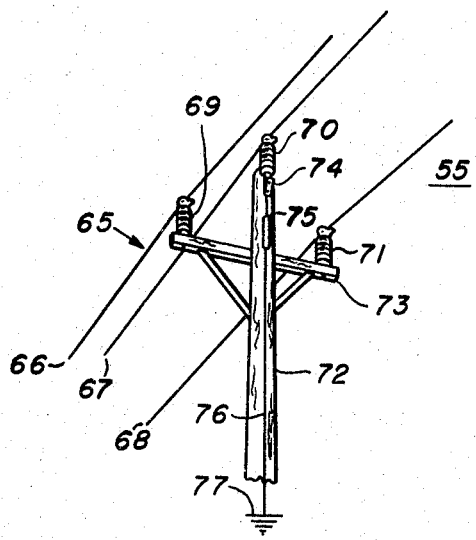
FIG. 5 illustrates a distribution line useful for practicing the inventions of FIGS. 1, 2, 3 and 4.

Referring now to FIG. 5, there is shown a distribution line 65, comprising line conductors 66, 67, and 68 supported by post insulators 69, 70, and 71, such as the insulator 20 of FIG. 6. The insulators 69, 70, and 71 are supported in elevated relation to the earth by a line pole 72, which carries the insulators 69 and 71 upon a cross piece 73 and the insulator 70 upon a bracket 74. The bracket 74 is connected to a discharge device 75, which is mounted on the pole 72 and connected to a metal ground wire 76. The ground wire 76 runs down the pole 72 to the earth and is connected to a ground 77.

In practicing the invention of FIG. 1, the discharge device 75 comprises a non-linear resistor corresponding to the resistor 17 to constitute the discharge circuit 19. In practicing the invention of FIG. 2, the discharge device 75 comprises the lightning arrester 37 connected in series with the insulator 60 to constitute the discharge circuit 38. In practicing the invention of FIG. 3 or of FIG. 4, the mounting brackets of the three insulators 69, 70, and 71 are connected to separate discharge devices to constitute the discharge circuit 54 of FIG. 3 or the discharge circuit 64 of FIG. 4.

The conductor arrangement of FIG. 5, in which the center conductor 67 is elevated above the outer conductors 66 and 68, is preferably combined with the discharge circuit of the embodiment of FIG. 1 or that of FIG. 2 to simplify the protective system for a given distribution line. The conductor arrangements in which the three conductors are at the same level are advantageously protected by the circuit arrangements of FIG. 3 or FIG. 4.

The discharge device 75, the conductor 76, and the ground 77 comprise a preferred discharge path from the conductor 67 and insulator 70 to ground due to the high conductivity of the conductor 76 relative to the conductivity of the pole 72. Accordingly, the invention is useful in avoiding damage to wood poles, cross arms, etc., due to lightning discharges, development of excess conductivity, and the like, which often destroy the parts of wood structures because of current conduction therein.

In some circumstances it may be desirable to connect the discharge device to system ground rather than directly to earth ground.

In FIG. 6, the combined device 80 comprises an insulating body 81 adapted to insulate a distribution line conductor from a pole or other supporting structure, according to the operating voltage of the line, and a valve block 82 comprising a non-linear valve resistor in structural form to support and carry the insulating body 81 from the pole or other supporting structure while constituting the series electrical discharge circuit described in FIG. 1 hereof. The insulating body 81 has the bottom extremity received in a base or casting 83, similar to the base 22 of the insulator 20.

The valve block 82 is constituted as a rigid monolithic body of silicon carbide and a ceramic or other binder, as is known in the art, as a solid or tubular part. The extremities of the valve block are received in annular bases 84 and 85, similar to the base 22, with cement bonds between the parts to constitute a rigid structural part. The base 83 of the insulating body 81 is secured to the base 84 as well as being rigidly supported thereby. The device 80 is supported from a cross arm or other structural member by a threaded fastener 86 which functions as a mounting bracket for the device, and a conductor cable 87 is received in a groove in the top 88 of the insulating body 81 and secured thereto by a tie wire 89.

In operation, an arc discharge is established between the lower part 90 of the tie wire 89 and the base 83 to complete the circuit to the terminal 84 of the valve block 82, and through the valve block 82 and the terminal 85 to the associated ground connection, the ground connection 91. Upon discharge of the system energy and increase in voltage across the valve block 82, the arc is interrupted and the conductor cable 87 is maintained at its normal line potential in insulated relation to the valve block 82 and the supporting structure.

The term "valve arrester" used herein refers to lightning arresters and protective devices adapted to function as a current limiting device when connected in the circuit arrangements of the invention described herein. Such devices usually incorporate silicon carbide valve blocks in series with fixed arc gaps or variable arc gaps, and are described, for example, in U.S. Patent 2,324,108 to S. C. Pyk, U.S. Patent 2,807,751 to E. Nilsson, U.S. Patent 2,825,008 to J. W. Kalb, U.S. Patent 3,019,367 to J. W. Kalb, and U.S. Patent 3,091,721 to A. G. Yost. Compositions suitable for the valve block 82 are known in the art and are described, for example, in U.S. Patent 2,206,792 and U.S. Patent 2,589,157 to B. Stalhane.

Although described with reference principally to alternating current circuits, the invention is useful in direct current circuits.

It is to be understood that the foregoing description is not intended to restrict the scope of the invention and that various rearrangements of the parts and modifications of the design may be resorted to. The following claims are directed to combinations of elements which embody the invention or inventions of this application.

I claim:

1. In an electric power line conductor system, a conductor, an insulator supporting the conductor and comprising an insulating body and a metal part electrically separated from the conductor by the insulating body and in contact with the exterior surface of the insulating body, and, in combination therewith, a series circuit from the insulator to ground comprising a resistor connected to the said metal part and a conductive wire to ground, the said series circuit comprising a conductive discharge path from the conductor to ground, and the said resistor comprising a current limiting means for electrical discharges over or about the said insulator.

2. Electrical apparatus for embodiment in the conductor system of claim 1, comprising a unitary combination of an electric insulator body and a resistor body electrically and mechanically in series, the resistor body supporting the insulator body and electrically in series between the insulator and the metal part and ground.

3. Electrical apparatus for embodiment in the conductor system of claim 1, comprising a valve resistor including a silicon carbide body and two terminals, one for connection to the insulator and one for connection to the ground wire.

4. In a power line, a plurality of line conductors, an insulator for one of the line conductors having conductive support means spaced from the conductor defining discharge paths along and across the exterior surface of the insulator, and a non-linear resistor connected in series from the said conductive support means of the said insulator to ground to constitute a discharge circuit from the line conductor to ground, and the said resistor comprising a current limiting means for electrical discharges over or about the said insulator.

5. A power line in accordance with claim 4, in which the limit currents of arc discharge across the insulator resulting from circuit functions to discharge line overvoltages on the conductor.

6. A power line in accordance with claim 4, in which the discharge circuit functions to limit currents along the surface of the insulator to prevent arcing thereof resulting from conductive contaminants on the surface of the insulator.

7. A power line in accordance with claim 4, with insulators for the remaining conductors of the said plurality of line conductors embodying the said conductive means, and each insulator have a separate valve resistor separately connected thereto and to ground.

8. A power line in accordance with claim 4, in which the valve resistor is one part of a valve arrester which includes an arc gap in series therewith.

9. Means for protecting a line conductor against overvoltage, comprising an insulating body, means at the top extremity of the insulating body for receiving a line conductor in secured relation thereto, base means at the remaining extremity of the insulating body for supporting the insulating body from a structural member, a valve resistor, and an electrical connection from the base means to one terminal of the valve resistor, the said insulator, valve resistor, and the electrical connection being adapted to constitute a series circuit between a line conductor carried by the insulator and a ground to reduce the voltage across the insulator upon conductive discharge from the conductor to the base means.

10. Means in accordance with claim 9, in which the valve resistor comprises the said structural member.

11. Combined means for supporting a line conductor, comprising an insulating body, means at one extremity of the insulating body for receiving a line conductor, a valve resistor comprising a structural body incorporating a conductive material therein, means supporting the insulating body from the body of the valve resistor at the remaining extremity of the insulating body with conductive means comprising a conductive terminal for the said valve resistor and an arcing terminal for the said insulating body, and a base at the remaining extremity of the valve resistor with means for supporting the assembly from a structural member.

12. Means in accordance with claim 11, in which the valve resistor is characterized by decrease in resistance with increase in discharge current.

13. Means in accordance with claim 11, in which the valve resistor is constituted by grains of silicon carbide in contact throughout the body and a fired ceramic binder therefor.

14. In an electrical conductor system in which there is a conductor and a ground associated with the conductor, in combination, an insulator supporting the conductor and a resistor connected electrically in series from the insulator to ground.

References Cited

UNITED STATES PATENTS

| | | | |
|---|---|---|---|
| 287,092 | 10/1883 | Brennan et al. | 317—72 X |
| 761,814 | 6/1904 | Bearse | 317—72 X |
| 2,666,908 | 1/1954 | Klostermann | 317—72 X |

MILTON O. HIRSHFIELD, *Primary Examiner.*

J. D. TRAMMELL, *Assistant Examiner.*